United States Patent
Rekstad

[11] Patent Number: 6,082,354
[45] Date of Patent: Jul. 4, 2000

[54] SOLAR COLLECTOR

[76] Inventor: John Rekstad, Nedre Gronlivei 31B, 1472 Fjellhamar, Norway

[21] Appl. No.: 08/793,406

[22] PCT Filed: Jul. 13, 1995

[86] PCT No.: PCT/NO95/00127

§ 371 Date: Apr. 18, 1997

§ 102(e) Date: Apr. 18, 1997

[87] PCT Pub. No.: WO96/07857

PCT Pub. Date: Mar. 14, 1996

[30] Foreign Application Priority Data

Sep. 2, 1994 [NO] Norway ..................................... 943257

[51] Int. Cl.[7] ..................................... F24J 2/26; F24J 2/48
[52] U.S. Cl. ........................... 126/674; 126/676; 165/907
[58] Field of Search ..................................... 126/676, 674, 126/677, 678; 165/104, 26, 907

[56] References Cited

U.S. PATENT DOCUMENTS

| Re. 31,321 | 7/1983 | Harrison . | |
|---|---|---|---|
| 3,369,539 | 2/1968 | Thomason . | |
| 4,068,652 | 1/1978 | Worthington . | |
| 4,166,445 | 9/1979 | Mcgraw | 126/674 |
| 4,180,056 | 12/1979 | Schnabel et al. . | |
| 4,310,747 | 1/1982 | Rice et al. | 126/674 |
| 5,313,933 | 5/1994 | Gocze . | |

FOREIGN PATENT DOCUMENTS

| 2364413 | 4/1978 | France | F24J 3/02 |
|---|---|---|---|
| 2395468 | 1/1979 | France | 126/674 |
| 24322687 | 2/1980 | France | 126/676 |
| 2719958 | 11/1978 | Germany | F24J 3/02 |
| 3001184 | 7/1981 | Germany | F24J 3/02 |
| 3041236 | 6/1982 | Germany | F24J 3/02 |
| 38223313 | 1/1990 | Germany | 126/676 |
| 352032140 | 3/1977 | Japan | 126/674 |
| 1541222 | 2/1979 | United Kingdom | F24J 3/02 |
| 2256702 | 12/1992 | United Kingdom | F24J 2/28 |

*Primary Examiner*—Carl D. Price
*Attorney, Agent, or Firm*—Ladas & Parry

[57] ABSTRACT

A solar collector plate (1) comprises a dark-colored absorber plate (2) facing the sun, parallel wall sheets (4) arranged perpendicularly to the rear side of the absorber sheet (2), fixed thereto and also fixed to a support sheet (3) arranged parallel to the absorber sheet (2), whereby cavity channels (5) are provided between said sheets (2, 3, 4) for flowing cooling liquid (6) which is intended to transport heat away from the absorber sheet (2). In order to provide a good thermal contact between the liquid (6) and the absorber sheet (2) at a low rate of liquid flow in the cavity channels, the cavity channels (5) are filled with particles (7), which particles lift the cooling liquid (6) to contact with the absorber sheet (2) by means of a capillary effect.

9 Claims, 1 Drawing Sheet

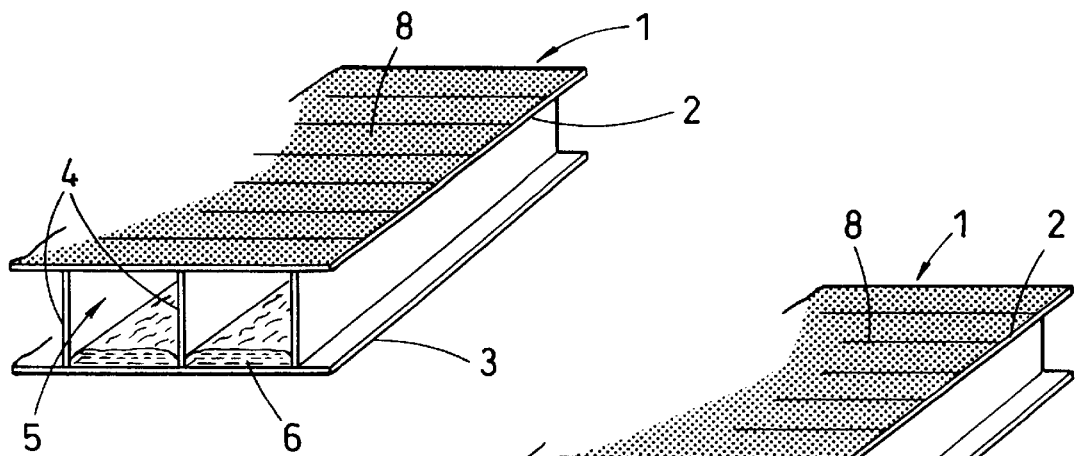
Fig. 1a
PRIOR ART
Fig. 1b
PRIOR ART
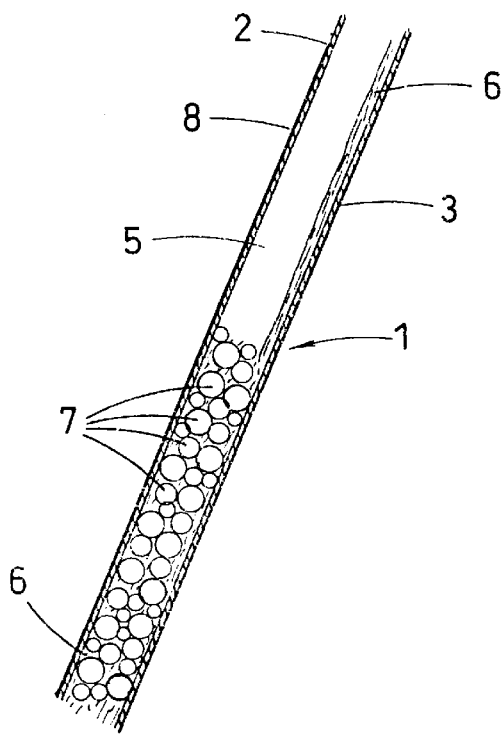
Fig. 2
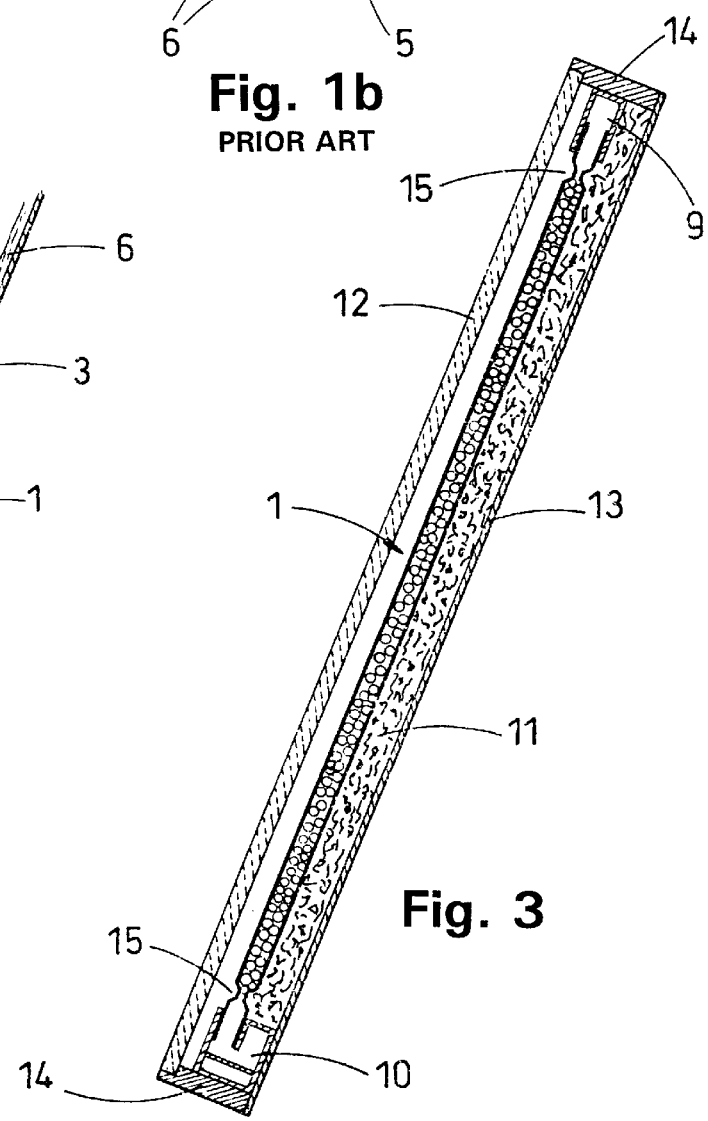
Fig. 3

SOLAR COLLECTOR

BACKGROUND OF THE INVENTION

The present invention relates generally to a solar collector, and more particularly to that member of the solar collector which provides conversion of the incident energy of the sunbeam radiation, to internal energy (heat) in a transportable cooling liquid.

A solar collector is a device which converts the energy in solar radiation to useful heat. The solar collector is preferably constituted by a black surface which absorbs the radiation. The surface is cooled by transferring the deposited heat to a cooling medium, preferably a gas or a liquid, in practice usually water, and is transported away. The black surface facing the sun is often covered by a transparent glass or plastic sheet in order to reduce heat loss to the surroundings.

In order to restrict the loss to the surroundings even further, so as to maximize the deliverable, useful quantity of heat from the solar collector, it is important to maintain the temperature of the radiation-absorbing surface as low as possible, in practice at a temperature as close as possible to the temperature of the cooling medium. In the most common solar collector configuration, this is achieved by providing the radiation-absorbing sheet with liquid-filled pipes in good thermal contact with the sheet. Often the liquid is water with added frost preventer (glycol). The radiation-absorbing surface or sheet if often made of metal, usually aluminium, to obtain a good thermal conductivity, so as to conduct heat effectively to the liquid-filled pipes. A disadvantage of this construction is that the liquid will always be inside the pipes of the radiation-absorbing sheet. The temperature conditions may vary, so that the liquid may boil or freeze. The temperature variations may also lead to substantial pressure variations.

Another disadvantage is that materials having very good thermal conductivity, i.e. metals, must be used. It would be advantageous to be able to use other materials like e.g. temperature resistant plastics, with regard to both weight and costs. Plastic solar collectors have already been put to use, however only a very simple variant without a glass cover, and preferably for heating swimming pools. Plastic solar collectors of this type do not exhibit the characteristics which can be obtained by means of the present invention.

SUMMARY OF THE INVENTION

Thus, the goal of the present invention is to provide a solar collector with a radiation-absorbing member constructed of a light, low-cost material, without problems associated with fluidum pressure inside the member, and with a satisfactory efficiency.

The goal is achieved by a solar collector plate of the type defined precisely in the appended claim 1. Further embodiments of the invention will appear from the appended patent claims 2-7. A complete solar collector in accordance with the invention is defined in patent claim 8.

The invention will be described in more detail in the following, with reference to embodiment examples, and it is also referred to the appended drawings where

BRIEF DESCRIPTION OF THE DRAWINGS

FIG. 1a shows a prior art solar collector plate, in a situation with a low rate of liquid flow, FIG. 1b shows the same solar collector plate as in FIG. 1a, however with maximum flow of cooling liquid, FIG. 2 shows a section through a solar collector plate in accordance with the present invention, and FIG. 3 shows a section through a solar collector in accordance with the invention.

DETAILED DESCRIPTION OF THE PREFERRED EMBODIMENTS

As a starting point, in the present invention is used a radiation absorbing plate, i.e. the member which is defined here as the solar collector plate, which is in principle a double or two-part construction. Two substantially parallel plastic layers are interconnected by means of transverse walls of the same material. Preferably polycarbonate is used, which material will tolerate temperatures up to 140° C. Double plastic plates of this type are mass-produced today, and the general construction thereof is as shown in FIGS. 1a and b.

The geometrical structure of such a double plate provides a large number of through channels having rectangular cross sections (in FIGS. 1a and 1b are shown only two such channels for simplicity, and with a square cross section). The complete solar collector plate is referred to using reference numeral 1. That one of the two parallel sheets which faces the sun, is defined as the absorber sheet 2, and the parallel underlying support sheet is provided with reference numeral 3. The transverse wall sheets 4, standing vertically in the drawing, define between them cavity channels 5 for transporting cooling liquid 6.

To provide absorption of the sun radiation, the top surface of the absorber sheet 2 is painted black (or some other dark colour), and the paint layer is designated by reference numeral 8. It is also possible to use a dye in the plastics material itself, The cavity channels 5 in the double-wall plate 1 are oriented so as to either stand vertically, if the plate 1 is mounted to a wall, or to take a downward slanting position if the plate 1 is laid on a roof or stands alone.

The cooling liquid 6 often runs in a string or in meander fashion along the bottom of the cavity channels 5. This provides a very poor thermal contact with the overlying absorber sheet 2: The plastics material used, has a very low thermal conductivity, typically about 0.2 W/Km. A typical double plastic plate has a material thickness of 0.5 mm and channel dimensions of between 6 and 10 mm. If the cooling liquid 6 does not fill the whole cavity channel 5, heat must therefore be conducted downwards along the transverse wall sheets 4 to get in contact with the liquid 6, see the situation illustrated in FIG. 1a, where the cooling liquid 6 flows along the "the floor" 3. With the geometric dimensions selected in the example, and with a dimension-providing thermal power of 800 $W/m^2$, which corresponds to a clear sun and perpendicularly incident radiation, the incoming radiation will for each cavity channel 5 be of magnitude order 4.8 W/m. With a conductivity L in the transverse walls given by: $L=\lambda \times A/d=0.0175$ W/K, $\lambda$ being the thermal conductivity of polycarbonate (0.2 W/Km), A being the cross section of a cavity channel wall ($5.10^{-4}$ $m^2$ per running meter) and d being the height of the cavity channel ($6.10^{-3}$ m), one finds that the temperature difference between the radiation absorbing surface, i.e. the absorber sheet 2, and the cooling liquid 6 must be as much as 270 K in order that the above stated power will be transferable.

If instead the whole channel volume is filled by liquid 6, see the situation illustrated in FIG. 1b, this temperature difference is reduced to merely about 2 K, since the conductivity through the absorber sheet which has a thickness of 0.5 mm is L=2.5 W/K per running meter for one single channel. This is of course due to the direct contact between the cooling liquid and the absorber sheet 2 itself.

As previously mentioned, the solar collector is placed vertically or in a slanted position in order to obtain as much incident energy as possible from the sun. This entails that when the cavity channels 5 are completely filled, substantial liquid pressures may arise due to the height of the solar collector, which may often be of size order 10 m. Such a liquid pressure is incompatible with the mechanical qualities of the described double plastic plate, and will in time lead to fracturing and breaking of the plastic walls 2, 3, 4. Thus, even if the thermal contact is good in the case of the filled channels like in FIG. 1b, it is not very desirable to use that much cooling liquid 6.

The novel and crucial feature of the present invention therefore amounts to creating a good thermal contact between the cooling liquid 6 and the absorber sheet 2 without simultaneously building up an unacceptable liquid pressure in the cavity channels 5. According to the invention this is achieved by filling the cavity channels 5 with particles 7 having dimensions and being made of a material which provides sufficient capillary effect to draw the cooling liquid 6 up around them and further up to provide contact, i.e. thermal contact, with the absorber sheet 2. The effect of the particles 7 is tentatively illustrated in FIG. 2, where the same reference numerals indicate the same details in FIG. 1.

The type of cooling liquid most often used, is water, and in connection with water it is favourable to use ceramic particles for filling the cavity channels 5. Measurements show that by using ceramic particles 7 having a diameter in the range 2 mm to 4 mm, a very good thermal contact is achieved between the absorber sheet 2 and the water. The efficiency of such a system with water pulled up by means of ceramic particles exhibiting capillary effect, turns out to be approximately equal to the efficiency of completely water-filled cavity channels. If some other liquid than water is used as a cooling medium, it may be more favourable with some other particle material and other dimensions, adapted to the surface tension and wetting characteristics of that medium.

the solution in accordance with the invention has the advantage that the liquid 6 will flow down through the cavity channels 5 due to gravity. Liquid 6 is supplied on top of the solar collector, and it is collected in the bottom of the solar collector. If the liquid supply is stopped, the cavity channels 5 are automatically emptied of liquid 6. (It is assumed that the outlet channel and discharge means are dimensioned so as to obtain drainage without filling pipes and channels completely.) This safeguards against frost or boiling damage.

In FIG. 3 is shown a section through a solar collector built in accordance with the invention. The particles 7 (see FIG. 2) are restricted to stay in the cavity channels 5 (see FIG. 2) by making the absorber sheet 2 and the support sheet 3 deformed in positions as shown by reference numeral 15, i.e. above and below the collection of particles 7 (see FIG. 2) filled in therebetween. The deformation of the sheets is brought about by pressing the solar collector plate 1 partly together in positions 15 at a temperature of about 160° C. These narrowed sections 15 insure that the particles 7 will not start travelling around in the liquid system, i.e. out of the solar collector plate 1.

In the bottom part of the solar collector appears a supply and collection channel 10 which both supplies liquid to the solar collector and transports the heated liquid away. Thus, channel 10 has two chambers. The liquid 6 is conducted from one of the two chambers up to the top of the solar collector in pipes not shown, which pipes may e.g. pass through some of the cavity channels 7 in the radiation absorbing double plate (solar collector plate 1). In the top part of the solar collector, the liquid is distributed to the many particle-filled cavity channels 5 by means of a distribution channel 9. Finally the liquid 6 flows out in the other chamber of the bottom channel 10, and is thereafter transported away. The solar collector plate 1 is insulated on its rear side by an insulating material 11, e.g. mineral wool, which is held in its position by means of a rear sheet, while the sunny side of plate 1 may be covered by one or two transparent cover glasses of a transparent plastic sheet 12. It is for instance quite possible to use the same type of plate as the solar collector plate 1 itself, however then of course a transparent plate and without particles or liquid in the channels thereof. At the top and at the bottom the solar collector is closed by end covers 14.

I claim:

1. A solar collector plate comprising an overlying absorber sheet and a substantially parallel, underlying support sheet, as well as a number of transverse wall sheets fixed between the absorber sheet and the support sheet to provide parallel-running cavity channels for transporting a cooling liquid which removes heat from the absorber sheet, wherein the cavity channels are filled with particle means for providing a capillary effect on the liquid so as to lift the liquid to thermal contact with the absorber sheet and to fill a free space between the particles and the absorber sheet, the support sheet, and the transverse wall sheets.

2. The solar collector plate of claim 1 wherein the particle means is a plurality of globular particles.

3. The solar collector plate of claim 2, wherein the particles consist of a ceramic material, the cooling liquid in use being water.

4. The solar collector plate of claim 3, wherein the particles have a typical dimension in the range 2–4 mm.

5. The solar collector plate of claim 4, wherein the distance between the absorber sheet and the support sheet is in the range 6–10 mm.

6. The solar collector plate of claim 5, wherein the absorber sheet, the support sheet and the wall sheets constitute an integral construction of a plastic material, preferably polycarbonate material, the absorber sheet having a dark colour.

7. The solar collector plate of claim 6, wherein the absorber sheet and the support sheet are deformed in the end sections of the cavity channels, having been subject to partial pressing together at an elevated temperature, in order to hold the particles in their place in the cavity channels.

8. The solar collector plate of claim 5, wherein the absorber sheet, the support sheet and the wall sheets constitute an integral construction of a plastic material, preferably polycarbonate material, the absorber sheet being covered by a layer of dark paint.

9. A solar collector comprising a forward transparent cover sheet, a rear sheet, a solar collector plate which absorbs sunbeam radiation and through which flows a cooling liquid, a heat insulating material between the solar collector plate and the rear sheet, as well as supply, distribution and collection channels for the liquid to and from the solar collector plate, the solar collector plate comprising a forward absorber sheet and a substantially parallel and rearwardly situated support sheet, as well as a number of transverse wall sheets fixed between the absorber sheet and the support sheet for providing parallel-running cavity channels for transporting the cooling liquid, wherein the cavity channels are filled with a particle means for providing a capillary effect on the liquid so as to lift the liquid to contact with the absorber sheet and to fill the free space between the particle means and the sheets delimiting the cavity channels.

* * * * *